United States Patent
Chinitz et al.

(10) Patent No.: US 6,233,461 B1
(45) Date of Patent: May 15, 2001

(54) METHOD AND APPARATUS FOR GROUP CALLS IN A WIRELESS CDMA COMMUNICATION SYSTEM

(75) Inventors: Leigh M. Chinitz; Michael L. Needham, both of Palatine; Timothy J. Wilson, Rolling Meadows, all of IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/589,246

(22) Filed: Jun. 7, 2000

Related U.S. Application Data

(62) Division of application No. 08/959,152, filed on Oct. 28, 1997, now Pat. No. 5,914,958.

(51) Int. Cl.[7] .............................. H04B 7/00; H04Q 7/20
(52) U.S. Cl. ..................... 455/522; 455/69; 455/518
(58) Field of Search ................... 455/522, 517, 455/518, 69; 370/252, 335, 342, 318

(56) References Cited

U.S. PATENT DOCUMENTS 5,003,619 * 3/1991 Morris et al. ...................... 455/69
5,621,723 * 4/1997 Walton, Jr. et al. ............... 455/522
6,005,848 * 12/1999 Grube et al. ....................... 455/518

FOREIGN PATENT DOCUMENTS 847 147     6/1998 (EP).

* cited by examiner

Primary Examiner—Nay Maung
Assistant Examiner—Lewis G. West
(74) Attorney, Agent, or Firm—Christopher P. Moreno; Jeffrey K. Jacobs

(57) ABSTRACT

A controller (120), in response to receiving a request for a group call (201) targeting a group (101), allocates at least one power adjustment channel to the group call (202) and sends identification of the at least one power adjustment channel to at least some of the subscriber units in the group (203). Using the at least one power adjustment channel, the controller also sends unique power adjustment information to each of the at least some subscriber units (204). Unique power adjustment channel access information is also sent to the subscriber units so that each subscriber unit can receive its own unique power adjustment information (503) and adjust its inbound transmission power (504) in response. In this manner, efficient reverse power control is provided for multiple subscriber units thereby facilitating group calls in CDMA systems.

21 Claims, 3 Drawing Sheets

METHOD AND APPARATUS FOR GROUP CALLS IN A WIRELESS CDMA COMMUNICATION SYSTEM

CROSS-REFERENCE TO RELATED APPLICATION

This application is a division of Ser. No. 08/959,152 filed Oct. 28, 1997 now U.S. Pat. No. 5,914,958.

Related subject matter is disclosed in prior co-pending, commonly assigned patent applications entitled "Establishment of Multiple Low-Rate Inbound Signaling Links in CDMA Dispatch System" Ser. No. 08/959,327, "Fast Call Setup In a CDMA Dispatch System" Ser. No. 08/959,152, both filed Oct. 28, 1997, and "Method and Apparatus for a Talkgroup Call In a Wireless CDMA System" Ser. No. 08/958,041 filed Oct. 27, 1997, which prior applications are hereby incorporated by reference verbatim, with the same effect as though the prior applications were fully and completely set forth herein.

FIELD OF THE INVENTION

The present invention relates generally to the field of wireless communications and, more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites have a substantially distinct coverage area and are geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

In a system that supports dispatch group calls, the communication units are typically arranged into communication groups (talk groups) and may be located anywhere within the system (in any site). When a communication unit of a talk group requests a group call, it transmits, via a control channel of the site in which it is located, an inbound signaling message to the communication resource allocator. (A group call typically allows all members of the same talk group that are located within the system to communicate with each other.) The inbound signaling message generally comprises the requesting communication unit's individual identification number, the requesting communication unit's talk group, and a request for a group call. Upon receiving the inbound signaling message, the communication resource allocator will allocate a voice channel in any necessary sites to the requesting communication unit's talk group.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talk group members are typically in a listen only mode (i.e., not able to transmit when another member is talking) and thus are not allocated a dedicated reverse link. In a TDMA system, for example, time slots are allocated to different users A talk group member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as code division multiple access (CDMA), has proved to be an alternative for serving large populations of multiple access users over analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a system supporting dispatch group calls. The difficulties in applying CDMA techniques to dispatch group communications (such as forward and reverse power control and the need to support soft hand-offs) are discussed in co-pending patent applications "Establishment of Multiple Low-Rate Inbound Signaling Links in CDMA Dispatch System" Ser. No. 08/959,327, "Fast Call Setup In a CDMA Dispatch System" Ser. No. 08/959,152. In addressing these problems, both of these prior applications discuss the establishment of a low-rate (non-voice) signaling link in the reverse direction (inbound). Using such a low-rate inbound signaling link, which signals at a predetermined rate substantially less than that of a full-rate traffic link, proportionately less average power is required for dispatch communications than would otherwise be the case if full-rate traffic links were provided instead to non-talking talk group members. Additionally, it is recognized in these prior applications that such low-rate reverse links can be used to maintain the correct reverse link power control for each non-talking member to allow for fast channel access for any follow-on calls (i.e., group-wide calls initiated by non-talking members following a current group call transmission).

While reverse links for dispatch group calls can be used to facilitate reverse power control, substantial difficulties must be overcome. In particular, it must be recognized that in existing CDMA systems, reverse power control is maintained in accordance with information sent over a forward (outbound) channel. In particular, existing CDMA systems use in-band control signaling (i.e., control signaling embedded in an outbound traffic channel) to continuously instruct individual subscriber units how to adjust their reverse power, typically up to 800 times per second. This method works well for one-to-one type calls. However, this method quickly breaks down for one-to-many type calls. In particular, the amount of information required to continuously update even a modest number of non-talking members in a group call would occupy too much of a given outbound traffic channel's bandwidth, leaving little, if any, bandwidth for the actual outbound traffic. Additionally, because the outbound traffic channel in a group call scenario would not be assigned to a single user, as in one-to-one type calls, it becomes necessary to direct specific reverse power control information to each of the non-talking members.

Thus, there exists a need to provide reliable and efficient reverse power control for group call communications in CDMA systems.

DESCRIPTION OF A PREFERRED EMBODIMENT

The present invention generally provides reliable and efficient reverse power control for group call communications in CDMA systems. Upon receiving a request for a group call for a given talk group, a controller allocates at least one power adjustment channel to the group call and sends identification of the at least one power adjustment channel to at least some of the subscriber units in the group. Using the at least one power adjustment channel, the controller also sends unique power adjustment information to each of the at least some subscriber units. In one embodiment, the unique power adjustment information is included in uniquely assigned portions of the at least one power adjustment channel. In another embodiment, unique addresses relative to the at least one power adjustment channel are used to convey the unique power adjustment information. In this manner, the present invention efficiently provides reverse power control information to multiple subscriber units and, therefore, facilitates the establishment of group calls in CDMA systems.

Figure 1:
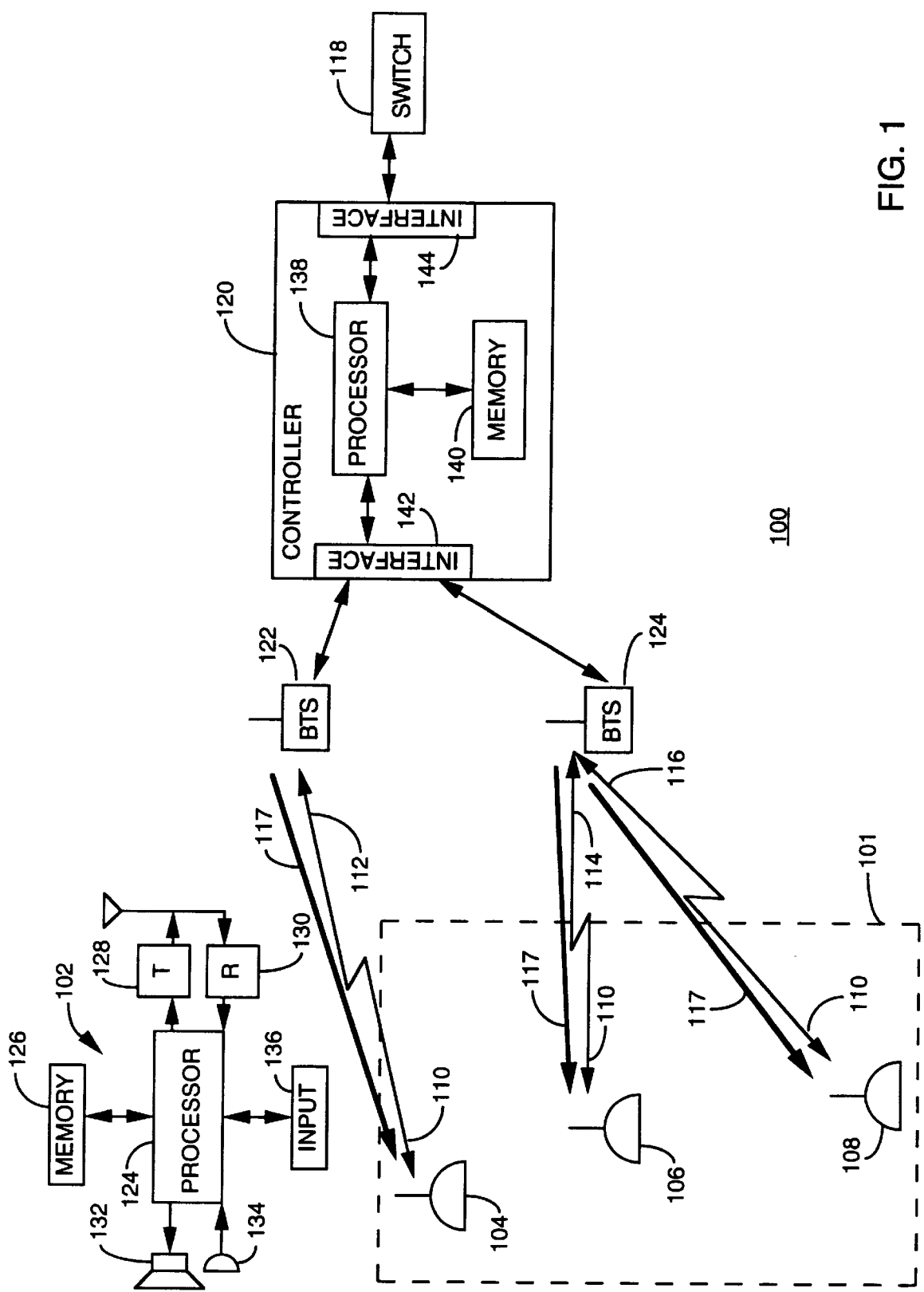
FIG. 1 is a block diagram of wireless communication system in accordance with the present invention.

The present invention can be more fully described with reference to FIGS. 1–5. FIG. 1 is a block diagram of a wireless communication system 100 in accordance with the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art, and comprises a plurality of subscriber units 102–108 arranged into at least one talk group 101 in wireless communication with a fixed infrastructure. In the illustrative embodiment, each of the subscriber units 102–108 is physically capable of duplex communications, although during typical group communications, only a single subscriber unit is transmitting at a time.

Communication channels are effectively provided through the use of codes using well known techniques, e.g., through a combination of orthogonal Walsh codes and pseudorandom noise (PN) sequences as in conventional cellular CDMA systems. When processing a group call, one or more outbound codes are used to effectively provide an outbound traffic channel (forward link) 110 to each subscriber unit in the talk group 101. Additionally, the present invention uses individual inbound codes to provide inbound traffic channels (reverse links) 112–116 from each subscriber unit in the talk group 101. Such inbound traffic channels, as discussed in co-pending patent applications "Establishment of Multiple Low-Rate Inbound Signaling Links in CDMA Dispatch System" Ser. No. 08/959,327, "Fast Call Setup In a CDMA Dispatch System" Ser. No. 08/959,152, and "Method and Apparatus for a Talkgroup Call in a Wireless CDMA System" Ser. No. 08/958,041, can be low-rate links or, in the alternative, can be full-rate traffic channels. Also, the present invention provides, through the use of one or more unique codes, at least one power adjustment channel 117, the use and operation of which is discussed in further detail below. In the example illustrated in FIG. 1, multisite operation is shown, i.e., where the subscriber units corresponding to the group are spread out among more than one site. In particular, the outbound traffic channel 110, inbound traffic channel 112 and power adjustment channel 117 are provided to a subscriber unit 104 at a first site via a first base transceiver site 122 using codes unique within that site. Additionally, the outbound traffic channel 110, inbound traffic channels 114–116 and power adjustment channel 117 are provided to the subscriber units 106–108 at a second site via a second base transceiver site 124 using codes that are unique within the second site and, depending on various system parameters such as geographic site separation, possibly the same codes used in the first site. Of course, it is possible that all subscriber units corresponding to a group could be located within a single site, in which case a single base transceiver site would be used to provide the channels.

The fixed infrastructure comprises those elements normally required to support communications within the wireless system 100 and, in the preferred embodiment, conforms to a typical CDMA architecture. In particular, the fixed infrastructure comprises a switch 118 in communication with a controller 120 that, in turn, is in communication with base transceiver systems (BTSs) 122–124. The switch 118 (often referred to as a Mobile Switching Center or MSC), controller 120 (often referred to as a Base Station Controller or BSC) and BTSs 122–124 are all well known in the art. The BTSs 122–124 are used for the transmission and/or reception of the outbound traffic channel 110, the inbound traffic channels 112–116 and the at least one power adjustment channel 117. In practice, switch 118 typically communicates with more than one controller, and may communicate with other equipment not shown. For purposes of simplicity, the fixed infrastructure has been limited as shown in FIG. 1. The management of group call processing is preferably handled by the controller 120. In the alternative, the functionality of group call handling, as described below, may be distributed throughout the fixed infrastructure.

Each of the subscriber units 102–108 comprises a common set of elements. In particular, a processor 124, which typically comprises a one or more processing devices (e.g., microprocessors, digital signal processors, etc.), is coupled to memory 126. The processor 124 is coupled to a transmitter 128, receiver 130, speaker 132, microphone 134 and input device 136. Each of these elements are well-known in the art. In the preferred embodiment, under control of software algorithms stored in the memory 126 and in cooperation with the other elements shown, the processor 124 performs those tasks required for operation of the subscriber unit, including the method described relative to FIG. 5. The receiver 130 is used to receive, in part: assignments of outbound and/or inbound codes for use in talkgroup calls, any voice and/or data traffic, and any deallocation messages. Also, identification of a power adjustment channel and information conveyed thereby, as discussed below, are received by the receiver 130. The input device 136, which may comprise a keypad, menu-driven display, push-to-talk button or similar device, allows users to transmit requests for group calls and to talk.

A typical, high-level construction of the controller 120 is also shown in detail in FIG. 1. A processor 138, which typically comprises a one or more processing devices (e.g., microprocessors, digital signal processors, etc.), is coupled to memory 140. Additionally, the processor 138 is coupled to interfaces 142, 144 which support communications between the controller 120 and the BTSs 122–124 and the switch 118, respectively. Each of these elements is well known in the art. In the preferred embodiment, under control of software algorithms stored in the memory 140 and in cooperation with the other elements shown, the processor 138 performs those tasks required for operation of the controller, including the method described relative to FIG. 2.

Figure 2:
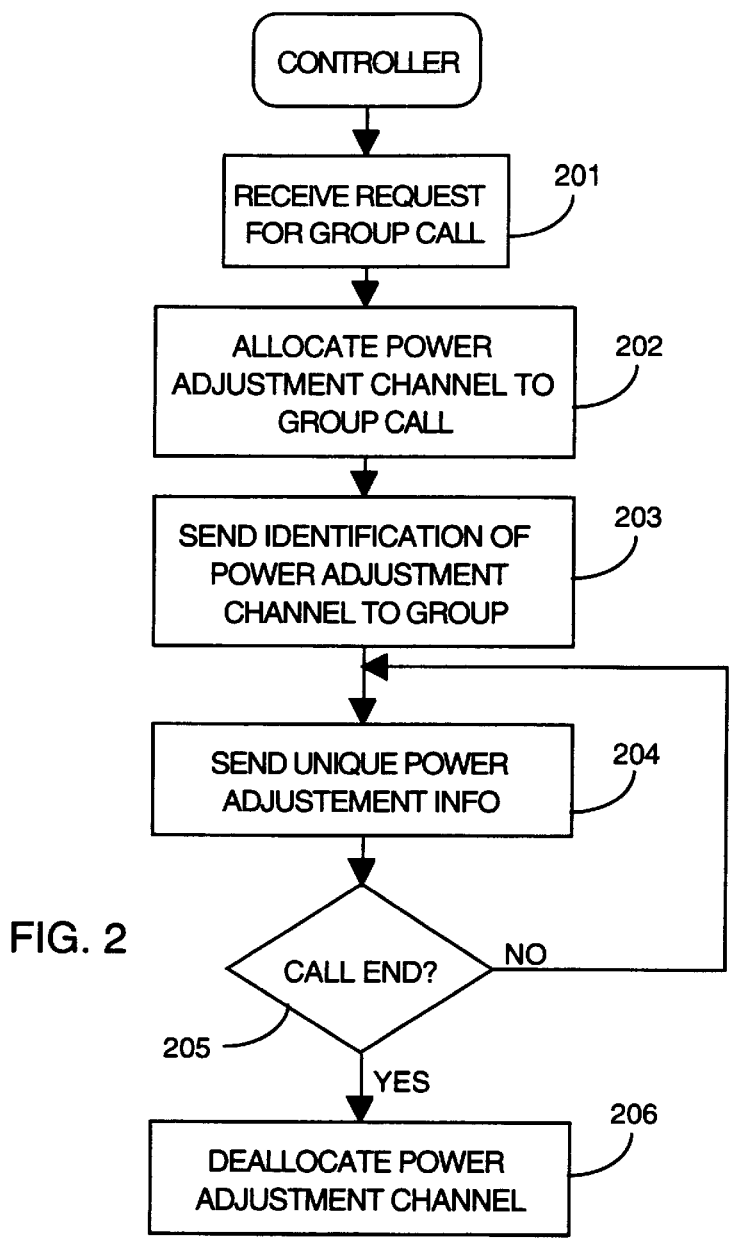
FIG. 2 is a flow chart illustrating a method for a controller in accordance with the present invention.

FIG. 2 is a flow chart illustrating a method whereby a controller can support a group call. The method described in FIG. 2 is preferably carried out by a controller. In the alternative, however, the functionality illustrated in FIG. 2 may be distributed throughout the fixed infrastructure, including the BTSs coupled to the controller. Regardless, the method illustrated in FIG. 2 is preferably implemented as stored software routines that are executed by the platforms in which the software is stored.

At step 201, the controller receives a request for a group call specifying at least the talkgroup for which the call is intended. Typically, the group call request can be originated by a subscriber unit that is a member of the targeted talkgroup or by a fixed dispatch position (not shown) wishing to establish communications with the talkgroup.

Responsive to receiving the request, the controller, at step 202, allocates at least one power adjustment channel to the group call. In the context of the present invention, the controller allocates the at least one power adjustment channel by reserving one or more codes for the at least one power adjustment channel. (The particular form of the code, i.e., a Walsh code, pseudorandom code, etc. is not relevant to the present invention. The only requirement is that the selected code provide a unique channel.) In practice, more than one code will be used because the subscriber units that make up the talkgroup will be distributed throughout many different cells, i.e., the coverage areas defined by separate BTSs. Because of this geographical diversity, a different code must be used in each cell in order to minimize any interference. In the example shown in FIG. 1, a single power adjustment channel 117 is shown. Because the power adjustment channel is used to convey power adjustment information to one or more units involved in the group call to which it is assigned, the power adjustment channel is an outbound-only channel. Also at step 202, the controller allocates traffic channels for the group call, including, in the preferred embodiment, low-rate reverse channels for one or more non-talking subscriber units in the targeted group.

At step 203, the controller sends identification of the at least one power adjustment channel to at least some (preferably, all) of the subscriber units in the group. Techniques for accomplishing this are well known in the art. For example, in a typical CDMA system, this would be accomplished by transmitting, via the paging channel within a given cell, information which identifies the code allocated for the power adjustment channel in that cell. Again, assuming the group call requires the use of resources within multiple cells, the power adjustment channel identification information would be unique to each cell.

Additionally at step 203, the controller also sends power adjustment channel access information (on a cell-by-cell basis, if necessary) to each of the subscriber units receiving the identification of the power adjustment channel. The power adjustment channel access information is information, unique to each subscriber unit in the talk group, that allows each subscriber unit to access its own unique power adjustment information transmitted on the power adjustment channel. To this end, the power adjustment channel access information may take one of two forms: an identification of a uniquely assigned portion of the power adjustment channel, or a unique address relative to the power adjustment channel. In the former option, the power adjustment channel is divided into a plurality of repeating time slots and the identification of a uniquely assigned portion of the power adjustment channel therefore comprises an identification of a time slot on the power adjustment channel uniquely assigned to a given unit. In the latter option, each subscriber unit is assigned a unique address, which address is used as a header to identify any information sent to a particular unit on the power adjustment channel.

At step 204, the controller sends, via the power adjustment channel, unique power adjustment information to each subscriber unit in the group that has also been given power adjustment channel access information. (In practice, power adjustment information is sent to a given subscriber as soon as the controller receives a transmission, i.e., via an inbound traffic channel or a low-rate inbound link, from the subscriber unit. Techniques for processing inbound transmissions to derive power adjustment information are well-known in the art.) The unique power adjustment information for each subscriber unit instructs the subscriber unit to which it is directed how to adjust its power on a continuous basis. For example, in accordance with current techniques, the unique power adjustment information for each unit may comprise a periodic stream of single bit flags, where a "0" bit indicates that the unit should increase its transmitted power by a predetermined increment and a "1" bit indicates that the unit should decrease its transmitted power by a predetermined increment.

Figure 3:
FIG. 3 illustrates an addressing technique for use with a power adjustment channel in accordance with the present invention.
Figure 4:
FIG. 4 illustrates another addressing technique for use with a power adjustment channel in accordance with the present invention.

FIGS. 3 and 4 schematically illustrate the content of a power adjustment channel given the two forms of power adjustment channel access information discussed above. FIG. 3 illustrates the case where the power adjustment channel access information takes the form of a uniquely assigned portion. As such, the i'th uniquely assigned portion of the power adjustment channel will comprise the power adjustment information for the i'th subscriber unit in the group. Having knowledge of when its uniquely assigned portion occurs within the power adjustment channel, a given subscriber unit can simply access the power adjustment channel at the correct time to ascertain its unique power adjustment information. (The synchronization required to implement such a scheme could be performed using well known techniques, i.e., through the use of a synchronization pattern.) Likewise, FIG. 4 illustrates the case where the power adjustment channel access information takes the form of a unique address. In that case, unique power adjustment information destined for the i'th subscriber unit will be prefixed by the unique address (preferably a multi-bit address) assigned to that unit. By monitoring the power adjustment channel, a given subscriber unit can ascertain its unique power adjustment information after each detection of its unique address.

It is recognized that the power adjustment channel of the present invention may be used alone to facilitate power control among the group members participating in a group call. In such a case, all units participating in the group call, including the currently transmitting unit, receive their respective power adjustment information via the power adjustment channel. It is also possible to use the power adjustment channel to convey the power adjustment information to only non-transmitting units in group. In this case, the currently transmitting unit would receive its power adjustment information using current techniques, i.e., in-band signaling on the forward link for the group call. However, this method would require that when one unit discontinues transmitting, and another unit proceeds with a follow-up call, the previously transmitting unit must be instructed to now receive its power adjustment information from the power adjustment channel, and the new transmitting unit must be instructed to no longer monitor the power adjustment channel and to receive its power adjustment information in-band. Finally, it is also possible to use both the power adjustment channel and in-band techniques simultaneously. This technique offers the advantage that when a unit switches to a transmitting unit, it already knows to look for in-band signaling and, conversely, when a unit stops transmitting, it knows to look to the power adjustment channel for its power adjustment information.

The controller continues to send the unique power control information, as described above, to each subscriber unit for the duration of the group call. When, at step 205, it is determined that the group call has ended, the controller deallocates the at least one power adjustment channel at step 206. After deallocation, the code or codes used to provide the at least one power adjustment channel would be available for other uses.

Figure 5:
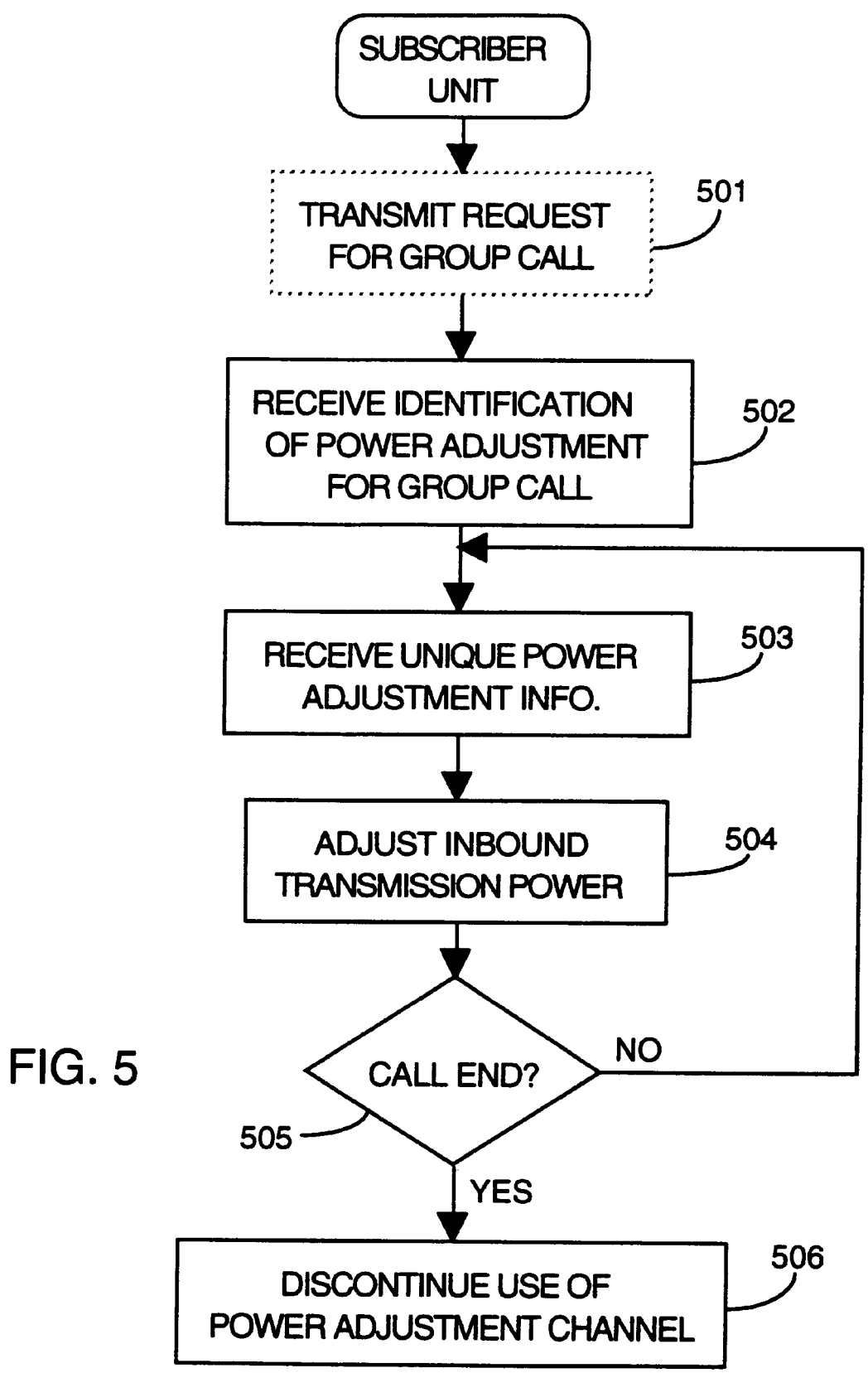
FIG. 5 is a flow chart illustrating a method for a subscriber unit in accordance with the present invention.

FIG. 5 is a flow chart illustrating a method whereby a subscriber unit can participate in a group call. The method illustrated in FIG. 5 is preferably implemented as stored software routines that are executed by each subscriber unit.

At step 501, a subscriber unit may optionally transmit a request for a group call. For the purposes of the present invention, any unit which transmits a request for a group call is assumed to be the initial transmitting unit for the group call. As discussed above, a transmitting unit in a group call may receive its power adjustment information via a power adjustment channel or via in-band signaling. However, it is also possible that a group call is not initiated by any subscriber unit in the group, as would be the case for a group call initiated by a dispatch operator. In that case, step 501 would not be executed.

Regardless, after a group call has been initiated, the subscriber unit (as a member of the targeted group) receives identification of at least one power adjustment channel allocated to the group call at step 502. The subscriber unit can be the transmitting subscriber unit, or it can be one of the non-transmitting group members. Additionally at step 502, the subscriber unit also receives power adjustment channel access information as described above.

At step 503, based on the identification of the at least one power adjustment channel and the power adjustment channel access information, the subscriber unit receives unique power adjustment information and, at step 504, adjusts its transmission power according to the unique power adjustment information. Steps 503 and 504 are continuously repeated for the duration of the group call. It should be noted that the subscriber unit, using known techniques, simultaneously receives and demodulates the power adjustment control channel and the outbound traffic channel assigned to the group call. When, at step 505, it is determined that the group call has ended (in accordance with known techniques), the subscriber unit discontinues use of the at least one power adjustment channel at step 506.

The present invention generally provides reliable and efficient reverse power control for group call communications in CDMA systems. Through the use of at least one power adjustment channel allocated to a group call, a controller may issue unique power adjustment information for each subscriber unit participating in the group call. This is facilitated by providing power adjustment channel access information to at least some, if not all, subscriber units participating in the group call. In this manner, the present invention overcomes the limitation of prior art techniques for reverse power adjustment and thereby supports group communications that were previously unavailable in CDMA systems.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. An improved wireless CDMA communication system of the type in which at least one base station is coupled to a controller, the at least one base station being in wireless communication with a plurality of subscriber units via at least one outbound traffic channel, the plurality of subscriber units being in wireless communication with the at least one base station via a respective plurality of inbound traffic channels, the improvement comprising:

at least one outbound power adjustment channel allocated to a group call involving a group of the plurality of subscriber units, the at least one outbound power adjustment channel being in addition to the at least one outbound traffic channel and the plurality of inbound traffic channels and enabling the controller to provide unique inbound power adjustment information to at least some subscriber units of the group.

2. The improved wireless CDMA communication system of claim 1, wherein the improvement further comprises:

means for transmitting the unique inbound power adjustment information via the at least one outbound power adjustment channel to each of the at least some subscriber units of the group.

3. The improved wireless CDMA communication system of claim 2, wherein the improvement further comprises:

means for sending, to each of the at least some subscriber units, an identification of a uniquely assigned portion of the at least one outbound power adjustment channel, wherein the uniquely assigned portion comprises the unique inbound power adjustment information.

4. The improved wireless CDMA communication system of claim 2, wherein the improvement further comprises:

means for sending, to each of the at least some subscriber units, a unique address relative to the at least one outbound power adjustment channel, wherein the unique inbound power adjustment information is sent via the at least one outbound power adjustment channel based on the unique address.

5. A subscriber unit for use in a wireless CDMA communication system comprising at least one base station coupled to a controller, the at least one base station being in wireless communication with a plurality of subscriber units via at least one outbound traffic channel, the plurality of subscriber units including the subscriber unit and being in wireless communication with the at least one base station via a respective plurality of inbound traffic channels, the subscriber unit comprising:

means for receiving, from the controller, an identification of a power adjustment channel allocated to a group call, the power adjustment channel being in addition to the at least one outbound traffic channel and the plurality of inbound traffic channels;

means, coupled to the means for receiving the identification of the power adjustment channel, for receiving, from the controller via the power adjustment channel, unique power adjustment information; and means, coupled to the means for receiving the unique power adjustment information, for adjusting, responsive to the unique power adjustment information, inbound transmission power of the subscriber unit.

6. The subscriber unit of claim 5, wherein the means for receiving the identification of the power adjustment channel further comprise means for receiving, from the controller, an identification of a uniquely assigned portion of the power adjustment channel, and wherein the uniquely assigned portion comprises the unique power adjustment information.

7. The subscriber unit of claim 5, wherein the means for receiving the identification of the power adjustment channel further comprise means for receiving, from the controller, a unique address relative to the power adjustment channel, and wherein the unique power adjustment information is sent via the power adjustment channel based on the unique address.

8. In a wireless CDMA communication system comprising at least one base station coupled to a controller, the at least one base station being in wireless communication with a plurality of subscriber units via at least one outbound traffic channel, the plurality of subscriber units being in wireless communication with the at least one base station via a respective plurality of inbound traffic channels, a method for the controller to establish a group call, the method comprising steps of:

receiving, from a requesting subscriber unit of a group, a request for the group call, wherein at least a subset of the plurality of subscriber units are logically arranged into the group;

allocating at least one outbound power adjustment channel to the group call, the at least one outbound power adjustment channel being in addition to the at least one outbound traffic channel and the plurality of inbound traffic channels and enabling the controller to provide unique inbound power adjustment information to at least some subscriber units of the group; and responsive to the request, sending, to the at least some subscriber units of the group, identification of the at least one outbound power adjustment channel.

9. The method of claim 8, wherein the identification of the at least one outbound power adjustment channel comprises identification of at least two different outbound power adjustment channels uniquely corresponding to separate cells with the wireless CDMA communication system.

10. The method of claim 8, further comprising a step of:

sending, to each of the at least some subscriber units, the unique inbound power adjustment information via the least one outbound power adjustment channel.

11. The method of claim 10, wherein the step of sending further comprises:

sending, to each of the at least some subscriber units, an identification of a uniquely assigned portion of the at least one outbound power adjustment channel, wherein the uniquely assigned portion comprises the unique inbound power adjustment information.

12. The method of claim 10, wherein the step of sending further comprises:

sending, to each of the at least some subscriber units, a unique address relative to the at least one outbound power adjustment channel, wherein the unique inbound power adjustment information is sent via the at least one outbound power adjustment channel based on the unique address.

13. The method of claim 10, wherein the at least some subscriber units includes the requesting subscriber unit.

14. The method of claim 10, wherein the at least some subscriber units excludes the requesting subscriber unit.

15. The method of claim 14, further comprising a step of:

sending, to the requesting subscriber unit, inbound power adjustment information via the at least one outbound traffic channel.

16. The method of claim 8, further comprising a step of:

when the group call has ended, deallocating the at least one outbound power adjustment channel.

17. In a wireless CDMA communication system comprising at least one base station coupled to a controller, the at least one base station being in wireless communication with a plurality of subscriber units via at least one outbound traffic channel, the plurality of subscriber units being in wireless communication with the at least one base station via a respective plurality of inbound traffic channels, a method for a subscriber unit of the plurality of subscriber units to participate in a group call, the method comprising steps of:

receiving, from the controller, an identification of an outbound power adjustment channel allocated to the group call, the outbound power adjustment channel being in addition to the at least one outbound traffic channel and the plurality of inbound traffic channels; and receiving, from the controller via the outbound power adjustment channel, unique inbound power adjustment information.

18. The method of claim 17, wherein the step of receiving the unique inbound power adjustment information further comprises:

receiving, from the controller, an identification of a uniquely assigned portion of the outbound power adjustment channel, wherein the uniquely assigned portion comprises the unique inbound power adjustment information.

19. The method of claim 17, wherein the step of receiving the unique inbound power adjustment information further comprises:

receiving, from the controller, a unique address relative to the outbound power adjustment channel, wherein the unique inbound power adjustment information is sent via the outbound power adjustment channel based on the unique address.

20. The method of claim 17, wherein the subscriber unit is a requesting subscriber unit.

21. The method of claim 17, further comprising a step of:

adjusting, responsive to the unique inbound power adjustment information, inbound transmission power of the subscriber unit.

* * * * *